Nov. 14, 1961 M. E. WALLIS 3,008,836
FOOD PACKAGE AND METHOD OF MAKING THE SAME
Filed Sept. 17, 1959 3 Sheets-Sheet 1
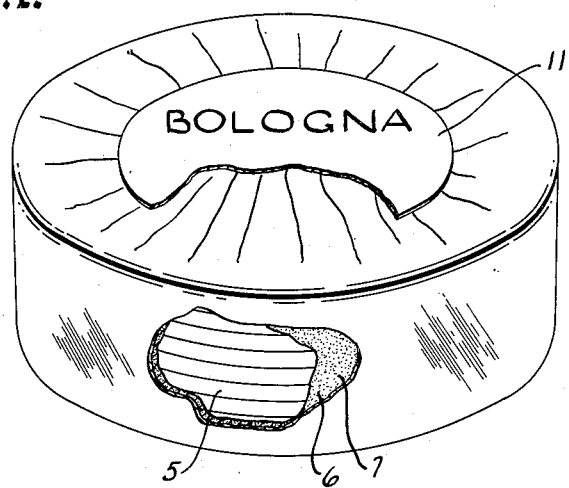
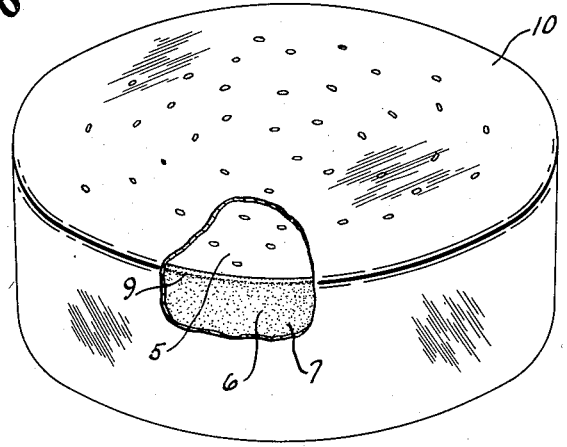

Nov. 14, 1961   M. E. WALLIS   3,008,836
FOOD PACKAGE AND METHOD OF MAKING THE SAME
Filed Sept. 17, 1959   3 Sheets-Sheet 2
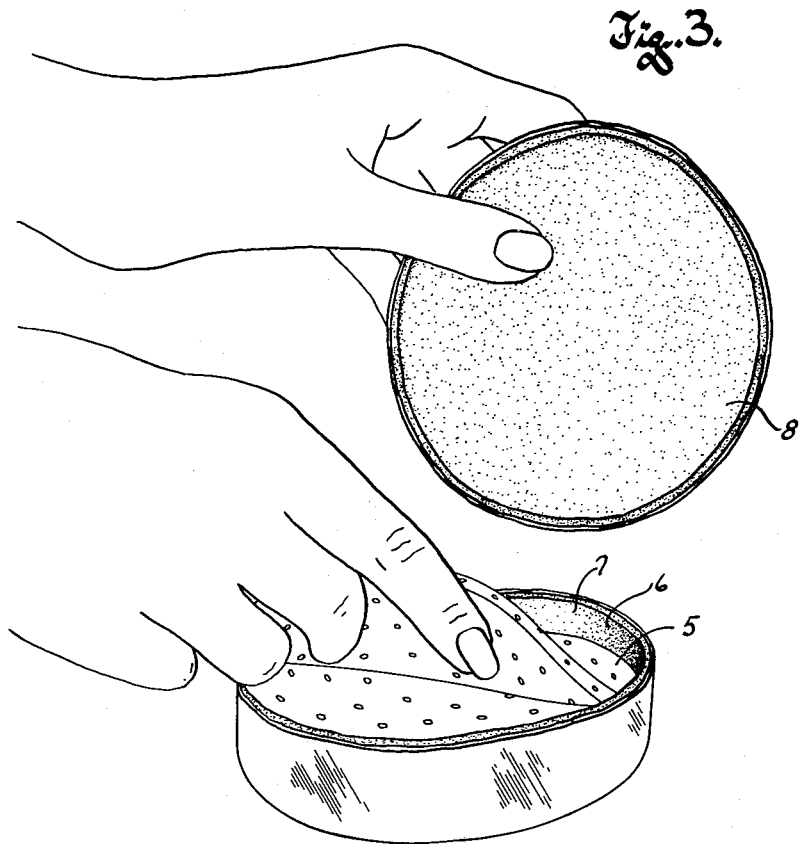
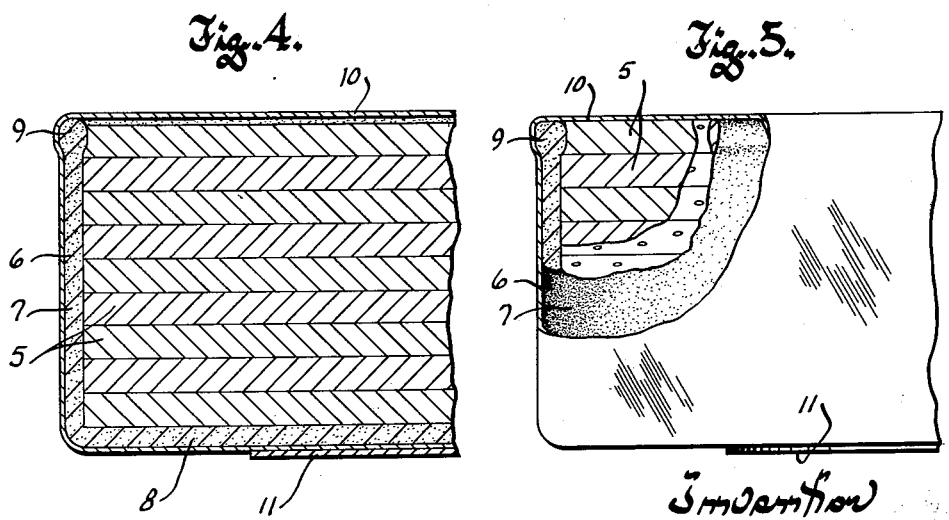
Inventor
Marvin E. Wallis Nov. 14, 1961 M. E. WALLIS 3,008,836
FOOD PACKAGE AND METHOD OF MAKING THE SAME
Filed Sept. 17, 1959 3 Sheets-Sheet 3
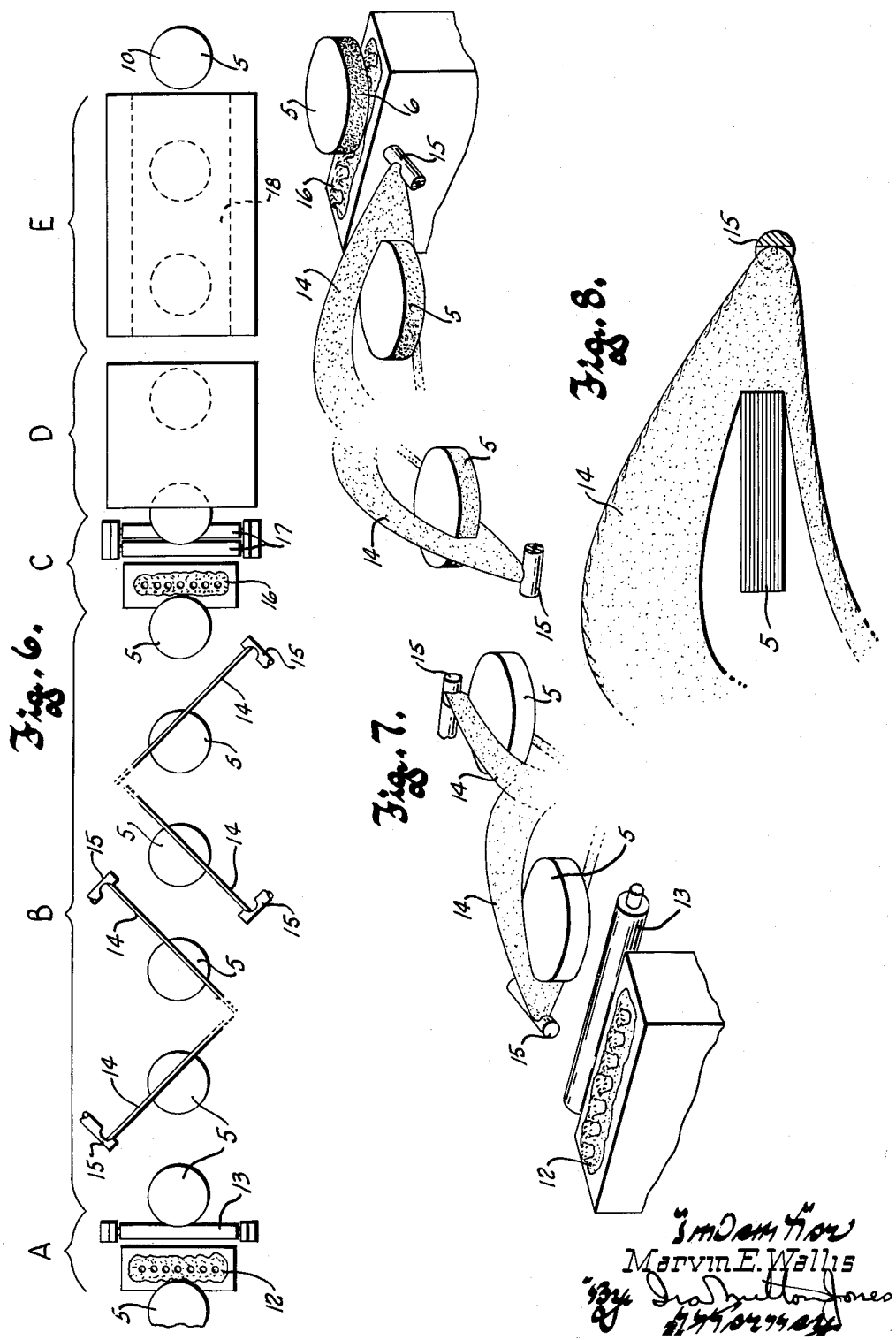

United States Patent Office 3,008,836
Patented Nov. 14, 1961

3,008,836
FOOD PACKAGE AND METHOD OF MAKING THE SAME
Marvin E. Wallis, 14145 W. Newell Drive, Brookfield, Wis.
Filed Sept. 17, 1959, Ser. No. 840,700
6 Claims. (Cl. 99—171)

This invention relates to packaged ready-to-eat food products, and refers more particularly to the packaging of such perishable foods as sliced luncheon meats, cheese, and the like.

Almost every conceivable variety of food now reaches the retail market in prepackaged ready-for-sale form. In fact, this practice has grown to such proportions that food in bulk form is a rarity in stores and shops. Ready-to-eat sliced luncheon meat and sausage, and even sliced cheese, are no exceptions to this new form of merchandising, but the packaging means heretofore available were not well suited for use with sliced ready-to-eat luncheon meat and sausage, and were especially deficient and inadequate in the case of sliced natural cheese.

Although food packages of the character here under consideration have appeared in many different forms, there are only two major types—one is the vacuum sealed plastic film package, the other is simply an enwrapment, often rather loose, of the so-called "heat shrink" type sealable plastic film or sheet, such as polyvinylidene chloride, better known as "Saran." Vacuum packaging of ready-to-eat luncheon meat is costly and, in addition, requires special processing of the food product. Moreover, it leaves much to be desired from the standpoint of flavor retention.

The greatest objection to vacuum packaging of ready-to-eat sliced luncheon meat, however, is the sliming effect which this method has upon sliced meat and sausage. This sliming not only detracts greatly from the eye appeal of the product once the package is opened, but seems to stimulate the growth of bacteria. A sliced meat product that has been vacuum packed, tends to discolor and spoil in a matter of hours after the seal is broken.

While the use of heat-sealed plastic films or sheets to wrap or package food products eliminates some of the objections noted with respect to the use of vacuum sealed packages, it is by no means a complete answer to the problem. Its greatest disadvantage, which it shares with all other presently available food packages of the type here under consideration, is that it offers no protection to the food, once the package is opened.

As is well known, even when the housewife purchased sliced luncheon meat or cheese from a shop which carried these products in bulk form so that she could buy just the amount she wished, she seldom, if ever, used the entire purchased quantity at one time. Usually she used only one or a few slices and then tried to package the remainder in some way in the hope of protecting it from contact with the air and preserving it for future use. Since pre-packaged food, of necessity, must be sold in predetermined amounts, the housewife does not even have the option in this case, of buying less if she chooses, so, consequently, any package which affords no protection to the food once the package is opened, in this respect is less desirable than the old-fashioned bulk sales.

Short shelf-life and, in most instances, lack of eye appeal, are other disadvantages of the use of heat-sealed plastic sheets.

With a view toward overcoming all the recognized shortcomings of prior attempts to put up sliced ready-to-eat luncheon meat and cheese in prepackaged form, this invention has as its purpose to so improve the packaging of such perishable food products that the result is a package which, in addition to being extremely low in cost, highly attractive in appearance, and offering exceptionally long shelf-life, has the very important advantage of providing a readily reclosable container for the unused portion of the product.

Another object of this invention is to provide a food package which is actually formed about the quantity of food to be packaged—for instance, a stack of sliced luncheon meat or sliced cheese, so that the shape and size of the package corresponds to that of the food product contained therein.

Another object of this invention is to provide a food package which comprises a shell of wax or other suitable material possessing the quality of being solid at room temperatures, but a viscous liquid at somewhat elevated temperatures, covering the bottom and sides of a stack of luncheon meat or the like, and a top wall of a heat sealable plastic sheet or membrane which may be entirely or partly transparent, hermetically sealed to the upper edge of the side wall of the shell and, in its application, drawn tightly over and laminated to the side and bottom walls, to the latter of which a label may be applied during the final sealing of the package; the bottom wall, either with or without a label thereon, thus being sufficiently rigid to serve as a lid after the package has been opened by cutting through its side wall just inwardly of its bottom wall.

Still another object of this invention is to provide an improved method of packaging perishable foods and particularly sliced luncheon meats and cheese.

With the above and other objects in view, which will appear as the description proceeds, this invention resides in the novel product and method by which it is made, substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention produced according to the best mode so far devised for the practical application of the principles thereof, and in which:

FIGURE 1 is a perspective view of a food package embodying this invention, the package being shown with its labeled bottom uppermost;

FIGURE 2 is a perspective view of the same package, viewed from the opposite or top side, to illustrate how its transparent wall displays the contents of the package;

FIGURE 3 is a perspective view of the package after it has been opened, and illustrating how it serves as a reclosable container for the unused portion of its contents;

FIGURE 4 is a fragmentary cross-sectional view through one side portion of the package at a greatly enlarged scale, and showing the same in its condition directly after the label has been applied, but before the final step in the forming of the package has been taken;

FIGURE 5 is a view similar to FIGURE 4, but showing the same in its final condition;

FIGURE 6 is a diagrammatic top plan view, illustrating the complete packaging operation;

FIGURE 7 is a perspective view of that part of the operation wherein the shell is formed around the bottom and sides of the food product; and FIGURE 8 is a detail view diagrammatically illustrating the manner in which the liquid film is applied to form the side wall of the shell.

The accompanying drawings illustrate a package of sliced luncheon meat produced in accordance with this invention, and also diagrammatically show the steps of the method used to form the package. The package consists of a stack of slices 5 of selected luncheon meat, a shell 6 having integral side and bottom walls 7 and 8, respectively, and a top 10 stretched across and hermetically sealed to the edge of the side wall. The shell is formed of a material which is a flexible or pliant and somewhat resilient solid at room temperatures, and a liquid at temperatures above approximately 120° F.–150° F. Petroleum wax to which a plasticizer such as polyethylene, polyisobutylene, natural rubber or butyl rubber and other desirable additives has been added, may be used. It is also possible to use certain waxes or plastic materials without any additives.

The bottom and side walls of the shell 6 intimately hug the adjacent surfaces of the food product and are of substantially uniform thickness throughout, except that the upper edge of the sidewall 7 is defined by a smooth-surfaced bead 9, which extends unbroken around the entire perimeter of the side wall and results from the manner in which the side wall is formed. As will be hereinafter described, this bead plays an important part in the formation of the package.

The top wall 10 is a film or membrane formed of a heat-sealable plastic material. Polyvinylidene chloride, which is a copolymer of polyvinyl and vinylidene, and is sold under the trademark "Saran," is well suited to this purpose, but other clinging type or well-known heat shrink films, such as "Videne" or "Cryovac" may be used. In any event, the material used for the top wall 10 should be transparent, glossy and shiny, and should be capable of being laminated to the wax or other material used for the shell. In addition, it must be susceptible to shrinkage upon brief subjection to heat not exceeding approximately 300° F.

The film or membrane 10 may be transparent throughout its entire area, or for only a part thereof, as would be the case if the film were imprinted with the processor's trademark or any desired indicia. The film is hermetically sealed to the beaded edge 9, and extends down over the side wall of the shell and onto the bottom wall 8, to both of which it is attached or laminated by heat.

A label 11 is preferably applied to the bottom of the package to identify its contents and processor, but because the top wall, or at least a part thereof, is transparent and the contents of the package are plainly visible therethrough, the purpose of the label, if one is used, would be mainly to identify the processor. Like the side and bottom walls, the top wall 10 also intimately hugs the adjacent surface of the food product. Hence, the entire enwrapment may be said to be skin tight, and, of course, it is air tight.

To open the package, the housewife places it with its wall 10 down and its labelled wall 8 up, and then cuts through the side wall 7 near its junction with the wall 8. Lifting of the severed wall 8 exposes the sliced food product for removal of all or any part thereof. The labelled wall 8 being strengthened by the "Saran" or other type film laminated to it and the paper label, and being resilient, serves as a convenient lid or cover for the opened package, as best shown in FIGURE 3. As here shown, the lid or cover thus provided may be telescoped into the opened container into relatively tight engagement with the side wall, to thus protect the unused contents of the package from contact with the air, the lid being pushed down into the space that had been occupied by the removed slices. In this manner, the unused contents of the container or package are given the maximum of protection, while at the same time the utmost convenience in handling the sliced product results. Obviously, the container is so inexpensive that once its contents have been used, it is simply thrown away.

One of the significant advantages of the food package of this invention resides in the fact that it preserves the flavor of the food to a far greater degree than has heretofore been possible. Just why this is so is not known, but it is believed that the desirable flavor preservation stems from the fact that the entire enclosure for the food product is skin-tight thereon and is completely hermetically sealed without the application of a vacuum which can and will draw off flavor. This characteristic of the package may also explain why there is no evidence of the objectionable and unsightly sliming which is experienced when meat is vacuum packed.

Another phenomenal result of this invention is that, for the first time, it enables some types of natural cheese to be packaged in sliced condition without the need for interleaving the slices with waxed paper or the like. In most prior attempts to put-up natural cheese in sliced and prepackaged form, the slices tenaciously stuck together. This was caused, no doubt, by the pressure imposed directly upon the pack during the formation of the package, a condition which is avoided by the present invention because of the relatively rigid support which the side and bottom walls of the container afford the contents thereof.

The material used to form the shell 6, though possessing a degree of flexibility or pliability and resilience, as noted hereinbefore, must be relatively tough and hard at room temperatures, so as to be capable of withstanding normal handling, and it must be a viscous liquid at temperatures above 120° F. to 150° F. Wax derived from a paraffin base crude oil, compounded with a plasticizer such as rubber or butyl rubber, has been used with excellent results. The amount of plasticizer that should be used will be readily understood by those skilled in the art. Certain microcrystalline waxes may be used without additives since they possess the required attributes, and also certain low molecular weight polyethylene may be used.

Where the food product is sliced ready-to-eat luncheon meat, it is, of course, kept refrigerated preparatory to, and even after it is packaged. Hence, it arrives at the coating machine where the shell 6 is formed about it, in a chilled condition at a temperature in the neighborhood of 35° to 45° F. If the product is not already refrigerated, it should be chilled to about the temperature indicated for best results.

Although the package of this invention could be produced by other methods, it is best done by the method about to be described and which, to a large extent, follows the teachings of the copending application Serial No. 664,529, filed June 10, 1957. In general, the method of this invention diagrammatically depicted in FIGURES 6, 7 and 8, comprises placing the food product 5 (a stack of luncheon meat or the like) upon a conveyor which carries it successively through a bottom-coating station A, a side-coating station or zone B, a bottom-finishing station C, a top-applying station D, and, finally, through a shrink tunnel E.

At the bottom coating station A, a mound or crowned pool 12 of the material used to form the shell extends across the bottom of the path of the advancing food product, and as the product moves onto and passes across this mound or pool, a layer of the coating material congeals upon its underside. The mound or crowned pool may be produced and maintained in any suitable way, as by continually causing liquid coating material to rise or flow up through a plurality of holes in a horizontally disposed plate. Directly after the underside of the food product is thus coated, it rides onto and across a freely rotatable roller 13 which smooths the surface of the applied bottom coating.

In the side coating station or zone B, the advancing food product passes through a succession of flowing viscous liquid sheets 14 of the same coating material, projected across the path of the advancing product, in such a way that none of the coating material forming these sheets is deposited on the top or the bottom of the product. Only its side surface or surfaces are coated at this station; and since this coating is applied in layers, it may be given almost any thickness. Ordinarily it is sufficient for the side coating to be 1/32 to 1/16 of an inch thick, and regardless of the contour of the surface of the product, the coating has substantially uniform thickness.

The zone into which the streams or flowing sheets 14 are discharged is maintained at a temperature above the melting point of the coating material. This temperature may be between about 125° F. and 160° F., depending upon the viscosity of the particular coating material being employed. Unnecessarily high temperatures should be avoided, even though the food product passes through zone B quite rapidly. As will be readily understood, the molten viscous coating material congeals and hardens almost instantaneously upon contact with the chilled food product, and by virtue of the manner in which the streams or sheets of coating material are formed and disposed with respect to the advancing food product, the sheets of the coating material lay themselves uniformly onto the side surface or surfaces of the food product, without breaking.

Each stream of coating material issues from a nozzle 15, which is so constructed and devised that it projects and simultaneously forms the viscous stream into a thin planar vertically disposed fan-shaped sheet with the molecular content thereof flowing generally horizontally from its point of origin, namely the nozzle. The nozzles 15 are located at opposite sides of the conveyor (not shown) and are arranged to project their respective planar sheets at oblique angles to the path of the advancing food product.

Although there are only four nozzles 15 and four projected sheets illustrated in the drawings, it will be understood that the number thereof may be multiplied or decreased as deemed best for the attainment of the desired results.

The relationship between the pressure at which the sheets 14 are projected from their respective nozzles, and the rate at which the food product is advanced through zone B, obviously has a bearing upon the manner in which the coating material is laid onto the side surface or surfaces of the product, but these factors are most satisfactorily determined empirically. They should be so chosen that the viscous stream or sheet does not break as it lays itself onto the intercepting surfaces of the food product, but, on the other hand, the coating material should not be allowed to accumulate and run down. When the conditions are correct, the several planar streams or sheets of coating material will form a side wall for the shell having the desired thickness which is uniform regardles of the contour of the surface of the food product, and which intimately hugs the surface of the food product.

At the bottom finishing station C, which the partially formed package enters after leaving the side coating station B, a second mound or crowned pool 16 of the liquid coating material is maintained in the same way as is the mound or pool 12. Here a second layer is added to the bottom coating, and then trimmed and rolled smooth by one or more freely rotatable rollers 17, over which the partially formed package moves.

As indicated, none of the coating material is deposited on the top surface of the food product, but at the upper edge of the side wall 7 of the shell 6, an unbroken smooth surfaced bead is formed. This is the bead previously identified by the reference numeral 9. The presence of this bead is significantly important. Because of it, it is easier to obtain a hermetically tight seal between the side wall of the shell 6 and the top wall 10 of the package. The application of the top wall takes place at station D and may be done by a wrapping machine of a conventional type, such as the Wrap-King which is well known in the industry.

In such wrapping machines, a web of the material being used is stretched out horizontally and cut off to the desired size. If desired, the web may have been imprinted with indicia so arranged that each sheet cut therefrom will have a definite pattern with a part thereof transparent and the remainder bearing a trademark or the like. In any event, the food product with the shell 6 applied thereto is pushed upwardly against the tightly stretched sheet. As this is done, the smooth surfaced bead 9 is brought firmly into contact with the sheet all around the entire circumference or perimeter of the bead; and because the side wall of the shell is relatively stiff and supported by the food product, the wrapping machine can stretch the sheet or film down over the side of the shell and tuck it under the bottom thereof as in the conventional manner, where it attaches itself to the shell. The label 11 is best applied onto the tucked under portion of the film.

The bead protrudes above the top surface of the food product about $\frac{1}{68}$ inch. Hence, as the sheet of the transparent film is stretched tightly across the top of the bead, it will be spaced slightly from the top face of the food product, as shown in exaggerated form in FIGURE 5. However, during the next operation, this slight space is completely eliminated and, instead, the wall 10 is brought into intimate contact with the food product across the entire top surface thereof. In preparation for this operation, the partially completed package is turned over to place its wall 10 downward, and, in this position, it is deposited on a conveyor 18 which carries it through the shrink tunnel E. The shrink tunnel, which is of any conventional construction, is maintained at a temperature of between 200° and 300° F. and its conveyor 18, being inside the tunnel, is also heated.

Thus, when the partially completed package is placed on the conveyor 18 in the manner described, the bead 9 is softened so that as the plastic film forming the transparent wall 10 shrinks due to the elevated temperature in the shrink tunnel, the wall 10 is drawn tightly against the adjacent surface of the food product. Consequently, when the package emerges from the shrink tunnel, two to four seconds after it enters the same, the enwrapment is skin tight.

During the passage of the package through the shrink tunnel, the transparent film also becomes tightly laminated to the side and bottom wall of the shell 6, thereby strengthening these walls and forming a hermetically tight sheath for the food product.

Although the method has been described in connection with the packing of sliced, ready-to-eat luncheon meat, the invention is by no means limited to the packaging of that particular product. Sliced natural or processed cheese can be, and has been, packaged by this method with considerable success, especially so since it does not cause the slices to stick together.

From the foregoing description, taken in connection with the accompanying drawings, it will be readily apparent to those skilled in the art, that this invention constitutes a significant advance in the art of packaging perishable foods, and provides a food package which not only has none of the objections of prior attempts to merchandise sliced ready-to-eat luncheon meat and cheese in prepackaged form, but has many salient features, such as low cost, attractive appearance and utility as a reclosable container for the unused portion of the package after it has been opened.

Those skilled in this art will also understand that while this invention is especially well adapted to the packaging of sliced food products, it is not limited thereto, but on the contrary provides an excellent way of packaging almost any food product.

What is claimed as my invention is:

1. The method of packaging a food product which comprises: chilling the food product; advancing the chilled food product along a defined path; in a first zone applying to the bottom of the advancing food product a coat of material which is liquid at temperatures above on the order of 120°–150° F. and hard at room temperature; in a second zone projecting a stream of viscous liquid coating material capable of hardening at room temperature, under pressure from a point at one side of said path and obliquely thereacross, and simultaneously forming said stream into a thin planar substantially vertically disposed fan-like sheet with the molecular content thereof flowing generally horizontally inwardly from its point of origin, so that as the food product moves along its path it passes through said sheet and in doing so has only those side surfaces thereof which oppose the direction of molecular flow of the sheet covered by said material; discharging more of the same liquid material into said second zone from a point at the other side of said path in the form of a second sheet which is similar in all respects to said first sheet, so that only the side surfaces of the food product at the other side thereof are covered by said material as the product moves through the second sheet; repeating the described deposition of said material onto the sides of the food product in said second zone as often as required to form a protective coating of the desired thickness on the side of the food product, which coating, together with the bottom coat forms an open-topped shell for the food product; after said shell is formed as described, stretching a film of plastic material over the top of the food product; and sealing said plastic film to the upper edge of the shell.

2. The method of packaging a food product which comprises: chilling the food product; while the food product is in its chilled state applying to only its bottom and side surfaces a coating in the liquid state of a material which is a viscous liquid at temperatures above a predetermined minimum, and which rapidly congeals and sets at temperatures below said minimum, to thereby form an open-topped shell about said food product; stretching a film of plastic material over the top of the food product; and sealing said sheet to the upper edge of the shell.

3. The method of packaging a food product which comprises: chilling the food product; while the food product is in its chilled state applying to only its bottom and side surfaces a coating in the liquid state of a material which is a viscous liquid at temperatures above a predetermined minimum, and which rapidly congeals and sets at temperatures below said minimum, to thereby form an open-topped shell about said food product; stretching a film of plastic material over the top of the food product, around the sides thereof and onto the bottom of the shell; sealing said film to the upper edge of the shell and to the side and bottom surfaces thereof; and applying a label to the thus covered bottom surface of the shell.

4. The method of packaging a food product which comprises: chilling the food product; while the food product is in its chilled state applying to only its bottom and side surfaces a coating in the liquid state of a material which is a viscous liquid at temperatures above a predetermined minimum, and which rapidly congeals and sets at temperatures below said minimum, to thereby form an open-topped shell about said food product; stretching a film of heat-sealable plastic material over the top of the food product and around the sides and onto the bottom of the shell; and briefly heating the thus wrapped package to thereby seal the film to the shell and cause the sheet to be drawn into intimate contact with the top of the food product.

5. The method of packaging a food product which comprises: chilling the food product; while the food product is in its chilled state applying to only its bottom and side surfaces a coating in the liquid state of a material which is a viscous liquid at temperatures above a predetermined minimum, and which rapidly congeals and sets at temperatures below said minimum, to thereby form an open-topped shell about said food product and at the same time form an unbroken smooth surfaced bead around the upper edge of said shell; stretching a film of heat sealable plastic material over the top of the food product and the bead; and heat sealing said film to the bead.

6. The package made in accordance with the method set forth in claim 2.

References Cited in the file of this patent

UNITED STATES PATENTS

| | | |
|---|---|---|
| 2,682,475 | Smith | June 29, 1954 |
| 2,733,151 | Zuercher | Jan. 31, 1956 |
| 2,843,497 | Stuckey et al. | July 15, 1958 |
| 2,864,710 | Pottle et al. | Dec. 16, 1958 |
| 2,898,212 | Olson et al. | Aug. 4, 1959 |